United States Patent
Goldmark

[19]

[11] 3,955,466
[45] May 11, 1976

[54] PERFORMANCE LEARNING SYSTEM

[75] Inventor: Peter C. Goldmark, Stamford, Conn.

[73] Assignee: Goldmark Communications Corporation, Stamford, Conn.

[22] Filed: July 2, 1974

[21] Appl. No.: 485,220

[52] U.S. Cl. .............................. 84/470; 35/8 A; 360/74
[51] Int. Cl.² ...................................... G09B 15/00
[58] Field of Search ............. 84/470, 477 R, 478; 360/74, 134; 35/8 A, 35 C

[56] References Cited
UNITED STATES PATENTS

| | | | |
|---|---|---|---|
| 1,229,142 | 6/1917 | Saenger | 84/470 X |
| 2,153,027 | 4/1939 | Ross | 84/470 |
| 2,519,103 | 8/1950 | Block | 84/470 X |
| 2,911,482 | 11/1959 | Dostert | 35/35 C X |
| 3,484,955 | 12/1969 | Lippert | 360/74 X |
| 3,587,180 | 6/1971 | Richt | 360/74 X |
| 3,610,086 | 10/1971 | Decker | 84/470 |
| 3,703,041 | 11/1972 | Kohtani | 360/74 X |
| 3,752,937 | 8/1973 | Mori et al. | 360/74 |

Primary Examiner—John Gonzales
Attorney, Agent, or Firm—St. Onge Mayers Steward & Reens

[57] ABSTRACT

A performance learning system is described for a program such as a musical score, a play, or vocal performance. An ensemble rendition of a program is recorded on a first track of a magnetic tape with a particular performance, which normally is a part of the program, being omitted from the prerecorded ensemble rendition. A control track is provided, along side the ensemble rendition on the magnetic tape, with control signals representative of preselected stop locations separating learning segments on a visual representation of the omitted performance. A student may record a performance on a third track of the tape while an exemplary performance of the omitted performance such as may be formed by a professional or teacher is recorded on a fourth track. A record/-playback apparatus is provided with a track selection network to enable the playback of a desired track or combination of tracks. A backtrack network is provided to enable a student, who is learning the omitted performance, to conveniently repeat previous learning segments by automatically returning the tape to the desired learning segment. The stop control signals may be formed of intelligible words when the tape is played back in a first direction, to orally identify the stop locations on the visual representations of the omitted performance. When the tape is moved in an opposite backtrack direction, the stop control signals operate to stop the tape at the desired previous learning segment. A system for forming the prerecorded magnetic program learning tape is described.

18 Claims, 6 Drawing Figures

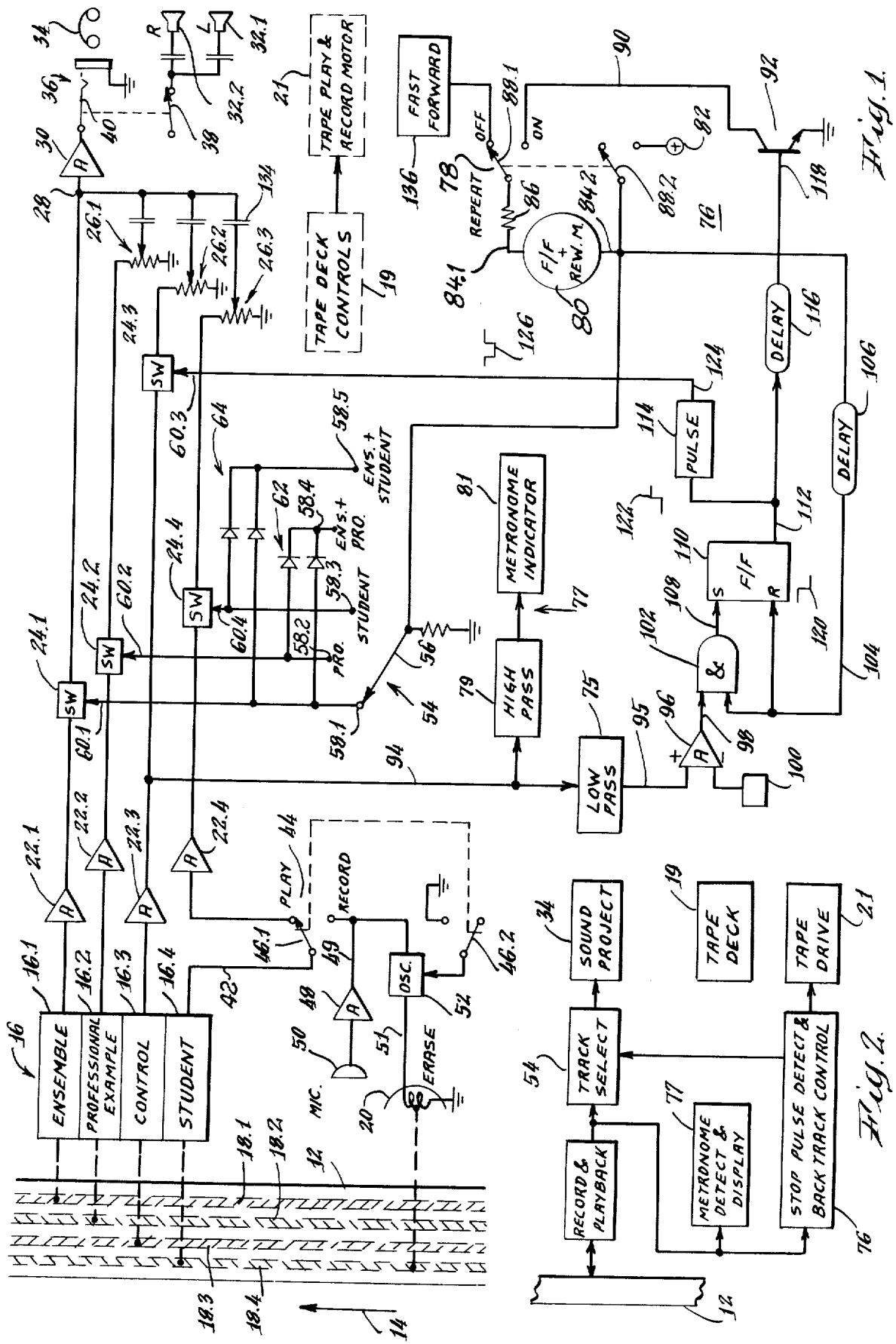

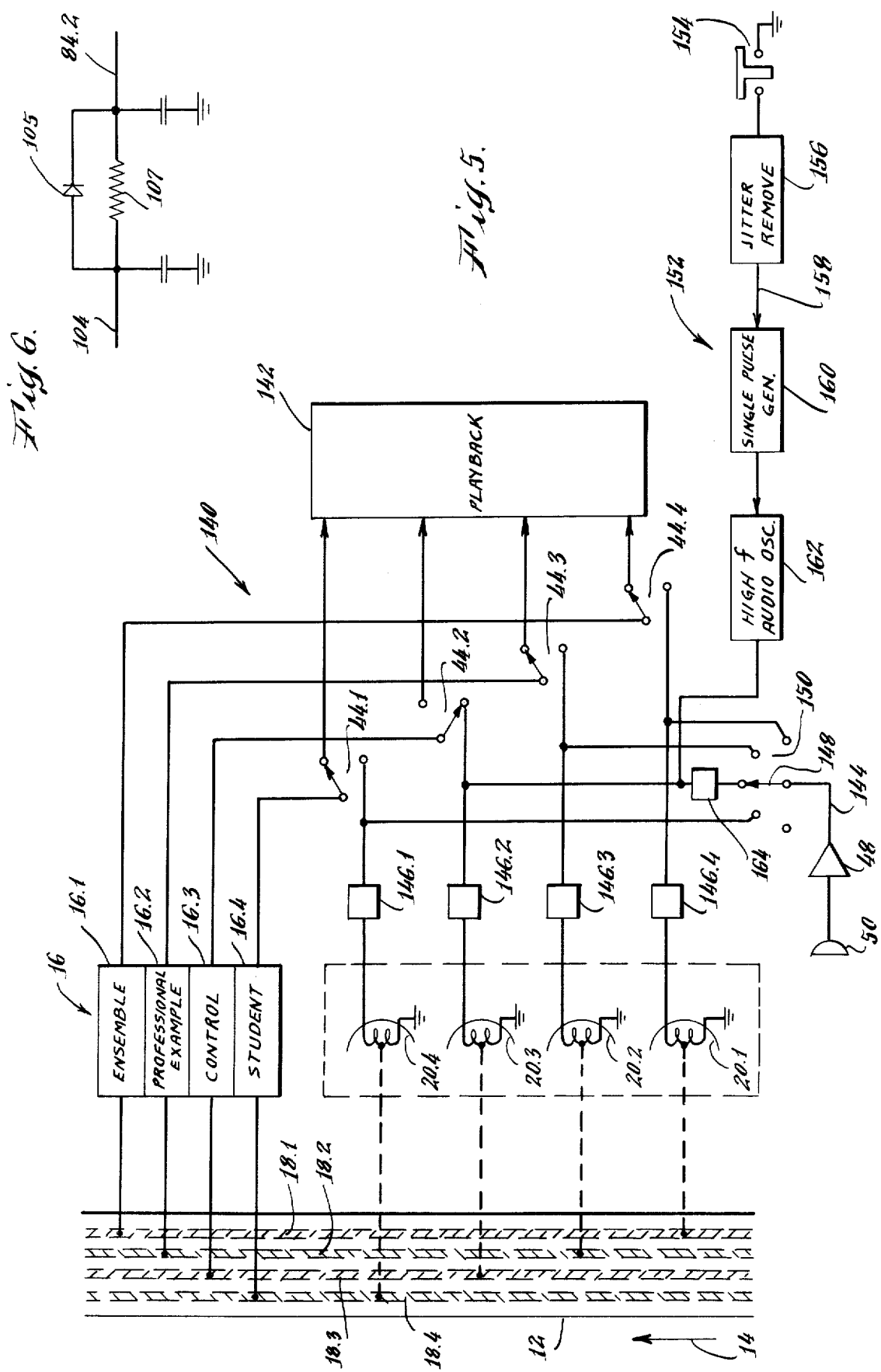

PERFORMANCE LEARNING SYSTEM

This invention relates to a performance learning system. More specifically, this invention relates to a magnetic learning system using a specifically prepared tape recording with which a student may learn the omitted performance of a program which may be for a musical score, a play or a vocal performance.

BACKGROUND OF THE INVENTION

Music learning devices have been proposed for many years. Note, for example, the U.S. Pat. No. to Ross 2,153,027. In the latter patent a phonograph recording is formed wherein the melody portion of an ensemble is subdued in comparison with the music portion having a primary function of accompaniment. A music student can play along with the music recorded on the record.

Other devices for teaching music have been described in the art such as a note and pitch teaching machine described in the U.S. Pat. No. to Reid 3,710,671 or the student performance recording device described in the U.S. Pat. to Elliott et al No. 3,601,904. Elliott et al discloses an apparatus by which a student is exposed to an audible and visual representation of the music the student is trying to learn. The student's performance is superimposed upon the audible presentation so that he can evaluate his own performance. The instructor may listen to the student's performance and, in turn, add specific individual audible instructions or address a group of students.

In U.S. Pat. to Vauclain No. 3,781,452, a musical score is composed from various prerecorded pitches and notes located on various tape tracks. The various prerecorded musical signals are selectively mixed and combined on a tape track to compose a desired musical score.

An automated rhythm teaching machine is described in U.S. Pat. No. to Reid 3,774,494, utilizing a multiple track tape recorder/player. In a first track of the tape an introductory metronome beat is recorded to condition the student to the proper tempo for background music recorded on the first track. A rhythm pattern is recorded on the second track and corresponds to a printed rhythm exercise. A third track may carry a metronome pattern. A microphone is employed to sense the student's performance and provide pulses representative of his rhythm. Circuitry is provided to compare the student performance with the recorded rhythm and a visual display of the rhythm pattern is provided.

Many tape recording devices for language instruction have been described in the art as may, for example, be observed in the Pat. No. to DeBell et al 3,705,271. In DeBell's patent a teaching machine uses a multiple track tape wherein one track carries a teacher and student response while a second adjacent track carries tone control signals. The latter signals are used to operate the teaching machine and enable it to switch into different operating modes. The DeBell device is particularly useful to record a student response to a teacher question and enable the latter to evaluate the student's pronunciation or provide the ability for the student to listen to his own response. Note other instructional tape recorders as described in the U.S. Pat. Nos. to Richt 3,587,180 and Kosaka 3,685,171.

Many other patents directed at music teaching schemes have been proposed as may be seen from the U.S. Pat. to Church, No. 2,600,968 for a music sight learning device; Irazoqui 3,026,634 for an audio/visual electronic instructor; Meyer 3,049,959 for an electronic ensemble composer and Milde 3,647,929 for a mechanical music composer using a magnetic tape with a large number of tracks.

Music records are commercially available on which a musical rendition of an ensemble is recorded but with a specific instrument missing. Such records are marketed by The Music Minus One Inc. of New York, N. Y. and are intended for use by an individual who plays the missing instrument along with the phonograph. The student who seeks to follow sheet music while accompanying the phonograph's rendition as it is played back is likely to run into difficulties at some point and then falls out of step with the phonograph.

Since the phonograph inexorably continues to play, it is difficult for the student to catch up. The music-minus-one record is, therefore, of limited value to the beginner student trying to learn a new musical score and tends to frustrate rather than re-enforce the less experienced student. The phonograph further does not enable a recording of the student's performance except by way of a separate recording device. In such case, however, the student's attention is divided between two instruments and reduces his concentration. Hence, in practice, the music-minus-one learning system is, at best, useful to the most skilled musicians who can easily follow the sheet music while simultaneously playing along without error with a high performance ensemble on a phonograph.

SUMMARY OF THE INVENTION

In a performance learning method and system in accordance with the invention, a multiple track magnetic medium is employed with a performance learning apparatus to enable a student to not only play along with an expert ensemble, but also synchronously record his own performance and repeat any desired segment in case of errors.

A prerecorded multiple track magnetic tape is formed carrying a prerecorded ensemble rendition of a program on a first track but with one preselected performance, which normally is a part of the program having been omitted. The program may be for a musical score such as a duet or quartet, orchestra with soloist or for a play or opera with a role deleted. Although the ensemble track does not carry a complete rendition of a program since a performance is missing, the term "ensemble track" is employed herein to identify that track which carries a rendition of the program with an omitted performance for the accompaniment and education of the student learning the omitted performance. The ensemble track thus may carry the rendition of a single voice or instrument when the complete program is for a two role play or musical duet so that upon the combination of the ensemble and student renditions, a complete program performance can be obtained.

On a second track of the magnetic learning medium a second student track is provided to enable the student to record his own rendition of the omitted performance while following a visual representation of the program and accompanying the ensemble rendition on the first track.

A third control track is provided with control signals which are chosen in predetermined relationship with visual presentation of the program, which the student follows, to establish predetermined stop locations for the student. The control signals, for example, may identify specific backtrack positions corresponding to visual notations employed on sheet music or cue positions of a play to thus enable the student to back up to any desired learning segment between successive notations.

For example, in a music adaptation of the performance learning system in accordance with the invention, a student may be recording his own rendition of a musical score for an omitted instrument while he is listening to the prerecorded ensemble rendition on earphones. When the student makes a mistake and falls behind the playback of the ensemble rendition, the student actuates a repeat mechanism to automatically back-up the ensemble rendition in a rapid manner to a previous learning segment. Normal operation can then be resumed from the previous learning segment with the student precisely aware of his place on the sheet music by virtue of the corresponding visual back-up notation.

The magnetic learning medium may be provided with a fourth track which carries an exemplary recording of the omitted performance. For example, a professional or teacher may record a rendition of the instrument or role omitted from the ensemble to provide the student with an example of a quality performance of the program.

The performance learning system in accordance with the invention thus provides a convenient and practical approach for a student's learning of a musical score or the role for a play and the like. The apparatus enables the student to compare his performance with professionals by mixing the student rendition with the ensemble rendition or mixing selected other tracks of the magnetic learning medium during playback.

In another use of a performance learning device in accordance with the invention, an instructor may produce a tape recording which, for example, may carry the instructor's preferred interpretation of the missing performance for an instructional program on the exemplary track. The student may then use the instructor's rendition as part of an assignment and record the student performance on the student track. In this manner the student will obtain a greater insight and understanding of the program and the various nuances and interpretations which may apply.

It is, therefore, an object of the invention to provide a performance learning method and system which is convenient to employ by a student. It is a further object of the invention to provide an instructional magnetic learning medium for a student seeking to learn a performance such as for a preselected instrument or a particular role in a play. It is still further an object of the invention to provide a performance learning system which may be adopted by an instructor for use with his own preferred instructional recordings for a student.

Brief Description of Drawings

These and other advantages and objects of the invention can be understood from the following detailed description of a preferred embodiment of the invention described in conjunction with the drawings wherein FIG. 1 is a partial schematic and system block diagram showing a performance learning system in the form of a music learning system in accordance with the invention;

FIG. 2 is a block diagram for the performance learning system shown in FIG. 1;

FIG. 5 is a partial schematic and block diagram view of a performance learning system for producing prerecorded magnetic tapes in accordance with the invention; and FIG. 6 is a circuit diagram for an unsymmetrical delay used in a back track network used in the performance learning system.

Detailed Description of Embodiment

Figure 3:
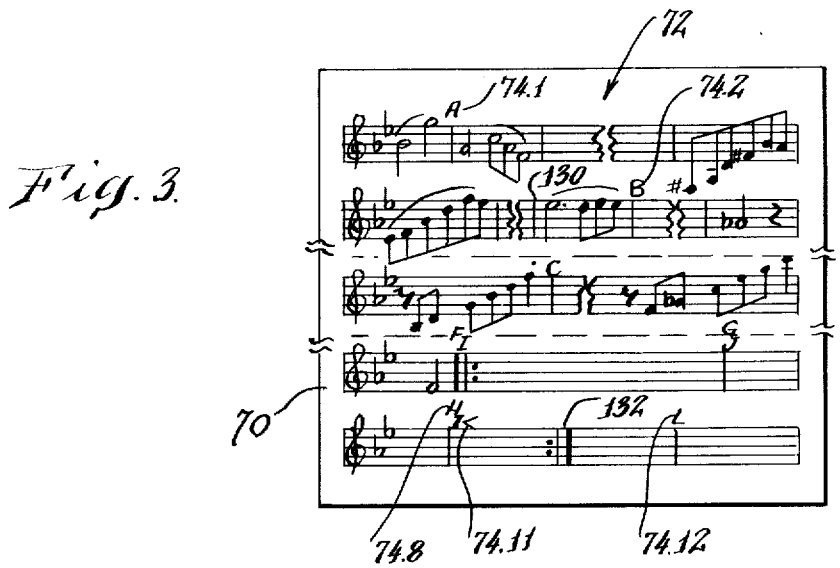
FIG. 3 is a broken partial view of a sheet of music carrying stop notations for use with a performance learning system as shown in FIG. 1.

With reference to FIGS. 1 and 2 a performance learning system such as a music learning apparatus 10 is shown in accordance with the invention. The illustrated embodiment is shown for a music learning system, though it is to be understood that other performing arts may be learned with the system of this invention. The apparatus 10 contemplates a tape recorder utilizing a conventional magnetic tape 12 such as partially illustrated in FIG. 1. The magnetic tape may be a reversible magnetic tape of undetermined length such as employed on so-called "reel to reel" tape. Preferably, the magnetic medium 12 is formed of a magnetic tape cassette having a pair of spools. The tape cassette 12 includes take-up and supply reels (not shown) to enable motors in the tape recorder to advance the tape in the direction indicated by arrow 14 past playback and recording heads 16. The tape cassette preferably is of the four track type of about 0.150 inch wide magnetic tape with an overall tape length sufficient to carry a musical score in a single pass past heads 16.

In the music learning embodiment shown in FIG. 1 the tape cassette 12 has been prerecorded and four tracks 18 on the tape 12 are used. The tracks 18 are schematically illustrated, with the first track 18.1 carrying a prerecorded rendition of a musical score produced by an ensemble of musical instruments with one instrument omitted. The prerecorded musical rendition on the ensemble track may, for example, include only the piano segment of an ensemble musical score intended to be performed by two instruments such as a piano and a clarinet. The term "ensemble", therefore, is further used in this specification to mean those renditions of musical scores of a program intended for performance by two or more instruments. The ensemble track 18.1 may thus carry the rendition of one instrument, which rendition when combined with the musical rendition of another instrument recorded on another track completes the ensemble rendition of the entire program.

The prerecorded tape cassette 12 is further provided on track 18.2 with an exemplary recording of the musical score by the missing instrument. A third track 18.3 is provided to carry control signals used to enable the student to adapt the use of the musical learning device 10 to his own learning tempo as will be further explained. A fourth track 18.4 is provided on the tape cassette 12 to allow the student to record his own performance in synchronization with the ensemble recording on track 18.1.

Playback and record head 16 enables the playback of the prerecorded signals on the ensemble, exemplary, and control tracks 18.1 through 18.3 as well as the playback and record capability of the student's performance on the student track 18.4. An erase head 20 is provided to remove signals on the student track 18.4 when the student is recording his performance. The playback heads 16 may be a composite head which is operatively disposed to play back signals on each of the tracks 18 or may be formed of separate heads. When playback and record capability is required, as for the student track 18.4, a separate playback record head 16.4 may be used to reduce crosstalk between tracks during a student recording.

Conventional tape deck controls 19 are provided to control suitable tape drive 21 to enable the playback and recording of the moving tape 12. The tape drive 21 is of the type which advances the tape at a speed of one and seven-eighths inches per second in a manner well known in the art.

The ensemble, exemplary and control playback heads 16.1-16.3 and student record/playback head 16.4 in its playback mode are respectively coupled to preamplifiers 22.1-22.4 to amplify and provide proper signal emphasis compensation of the signals detected from tracks 18. The output of amplifiers 22 are supplied through electronically controlled playback switches 24 and volume controls 26 to the input 28 of an output amplifier 30 which drives either speakers 32 or earphones 34 depending upon whether an earphone plug (not shown) is applied to phone jack 36. Note that amplifier 30 is coupled through a switch 38 to speakers 32 with switch 38 ganged to pole 40 of phone jack 36 to open the circuit between speakers 32 and amplifier 30 when an earphone plug is inserted in jack 36.

For recording purposes, the output line 42 from the student record playback head 16.4 is coupled through a record/play mode switch 44 to the input of preamplifier 22.4. In the playback mode, the pole 46.1 of switch 44 is coupled to amplifier 22.4, but in the record mode pole 46.1 is connected to the output of a microphone record amplifier 48. A microphone 50 is connected to amplifier 48 on whose output 49 is also applied the bias frequency of an oscillator 52 which also provides an erase signal on output 51 to erase head 20. A pole 46.2, ganged to pole 46.1, provides oscillator 52 with a disable signal floating in the playback mode and removes the disabling signal in the record mode with a ground potential.

A track selector 54 is provided to enable one to select the tracks to be listened to during playback. The track selector 54 is formed of a switch having a pole 56 which may be moved to any one of five playback contacts 58. Each of the contacts 58 is coupled to a control input 60 of a playback switch 24, either directly as for contacts 58.1-58.3 or through diodes 62, 64 for contacts 58.4 and 58.5 respectively. Playback switches 24 are closed upon the application of a ground potential to an input 60 and opened when an input 60 goes positive.

In a first position of pole 56 of track selector 54, pole 56 provides an enabling ground potential to contact 58.1 to thus close the playback switch 24.1 in series between ensemble amplifier 22.1 and the output amplifier 30. Hence, in this track selector position, the ensemble track 18.1 is being played back through the output amplifier 30.

In the second operative position of track selector 54, the exemplary or professional track 18.2 only is permitted to be played back by enabling playback switch 24.2.

In a third operative position of track selector 54, pole 56 causes closure of playback switch 24.4 thus enabling one to listen to the student track 18.4.

A fourth position of track selector 54, with the pole 56 coupling a ground potential to contact 58.4 both the ensemble and the exemplary playback switches 24.1 and 24.2 are closed by grounding their control inputs 60 through diodes 62. Both exemplary and ensemble track signals are then applied to input 28 of output amplifier 30 for playback.

In the fifth position of pole 56 of track selector 54, a playback switch closing signal is supplied through diodes 64 to both the ensemble and student playback switches 24.1 and 24.4 to allow the combination playback of ensemble and student tracks.

An alternate approach for track select network 54 involves individually controllable switches which are respectively actuated as desired. In this manner any number and combination of channels or tracks 18 may be played back.

When a student desires to play along with the ensemble rendition on track 18.1 while recording his own performance on track 18.4, the mode switch 44 is placed in the record mode and the track selector 54 in the first position to enable ensemble signals to reach headphone 34. The student is provided with a visual representation 70 of the omitted instrument in the form of a music sheet (see FIG. 2) carrying a musical score 72 for the missing instrument for the ensemble rendition prerecorded on track 18.1. The music is printed on sheet 70 with conventional music notations as illustrated and with specific stop notations such as 74 added. The stop notations 74 correspond to stop signals recorded on control track 18.3 and are located to define specific learning segments. The stop signals on control track 18.3 are passed through a low pass filter 75 for detection by a backtrack network 76 to enable the student to back up to a previous learning segment located between successive stop notations 74. The stop control signals may be dispersed on other tracks rather than on a particular track 18 dedicated therefor. In such case, frequency multiplexing techniques may be employed whereby the stop control signals can be retrieved from other signals on the track on which the stop control signals are located.

A metronome detection and display network 77 is used to provide indications of the rhythm to be employed. The metronome signals are recorded on the control track 18.3 with high audio frequency signal bursts to enable a high pass filter 79 to remove the bursts for display in a metronome indicator 81 such as an appropriately located light.

Note that the use of metronome signals may be dispensed with when rhythm pulses are not deemed essential. In such case the low pass filter 75, high pass filter 79, and networks 77, 81 need not be employed. In case of the use of system 10 for the learning of a role for a play, the metronome signals can, of course, be dispensed with.

The backtrack network 76 is commonly brought into operation when the student errs and falls behind the playback of the ensemble rendition or desires to repeat a music learning segment. The backtrack network 76 is activated with a repeat switch 78 operatively and electrically coupled between an electric power source 82 and a motor 80 which may serve to rewind the tape or move it fast forward depending upon the potential applied. The motor 80 is operatively coupled to back up the tape 12 at an accelerated speed in a manner which is known in the art and, therefore, not shown in greater detail. One lead, 84.1, from motor 80 is shown coupled through a current limiting resistor 86 to pole 88.1 of repeat switch 78. The other lead 84.2 from motor 80 is coupled to pole 88.2 and pole 56 of track selector 54.

Repeat switch 78 may be of the push-on and push-off type. In the illustrated position for repeat switch 78, the motor 80 is not activated. When repeat switch 78 is actuated, lead 84.2 is provided with a positive potential from source 82 and lead 84.1 is coupled to ground through switch 78, lead 90 and a semiconductor switch 92. Hence, in the activated position of repeat switch 78, the motor reverses the tape 12 opposite to the direction indicated by arrow 14, provided the backtrack network 76 also has rendered semiconductor switch 92 conductive.

The motor 80 actuation by repeat switch 78 does not release operative contact between playback heads 16 and tape 12. Hence, as the motor is energized and operates, the amplifiers 22 provide output signals detected by the rapid rewind movement of the tape 12 past heads 16. The signals from amplifiers 22.1, 22.2 and 22.4 are prevented from being applied to amplifier 30 by virtue of the disabling effect of the positive potential on lead 84.2 coupled to pole 56 of track selector 54. The signals from the control track amplifier 22.3, however, are applied along line 94 and through low pass filter 75 to backtrack network 76.

The output of amplifier 22.3 is coupled to an analog comparator 96 which produces an active output on line 98 whenever the control pulse signal strength on line 95 exceeds a threshold value from a threshold network 100. The threshold level is selected sufficiently high to prevent an output from comparator 96 during normal playback speeds of tape 12. The output from comparator 96 is applied to an AND gate 102 together with the output line 104 from a delay network 106. The input to delay network 106, in turn, is coupled to lead 84.2 of rewind motor 80.

The output 108 of AND gate 102 is coupled to a set input of a flip-flop 110 whose reset output 112 is coupled to a single pulse producing network 114 and through a delay network 116 to the control input 118 of the semiconductor switch 92. The latter may be, as illustrated, a transistor having its base, emitter and collector electrodes connected as shown. Flip-flop 110 is of the type which responds only to input signals whose polarity changes from a positive value to ground as shown by waveform 120. When an activating condition arises at the reset input, R, of flip-flop 110, the output 112 goes active or positive, and conversely, when an active signal is applied from AND gate 102 to the set input, S, of flip-flop 110, the output 112 goes inactive or back to ground potential.

Pulse network 114 is of the type which responds to waveforms on output 112 having the characteristic as shown by waveform 122, i.e. from ground potential to a positive potential. The output 124 from pulse network 114 is a single switch closing pulse 126 coupled to the input 60.3 of playback switch 24.3.

In the operation (see also the timing waveforms of FIG. 4) of backtrack network 76, flip-flop 110 is normally in the reset state, i.e. with its output 112 active or positive. During turn-on of system 10 such state can be assured by an appropriate bias network (not shown). With output 112 active, the semiconductor switch 92 is enabled or closed. However, current cannot flow until the repeat switch 78 is actuated by the student.

Assume that the student is recording his performance while listening to the playback of the ensemble track 18.1, i.e. with the track selector 54 in the position as illustrated in FIG. 1. The student plays along with the ensemble as he hears it, progressing through the learning segments designated between stop notations such as A, B and C. Suppose the student makes an error during the learning segment following stop notation B. In order to repeat the learning segment, repeat switch 78 is activated by pushing it on at time $t_1$, see FIG. 4.

Figure 4:
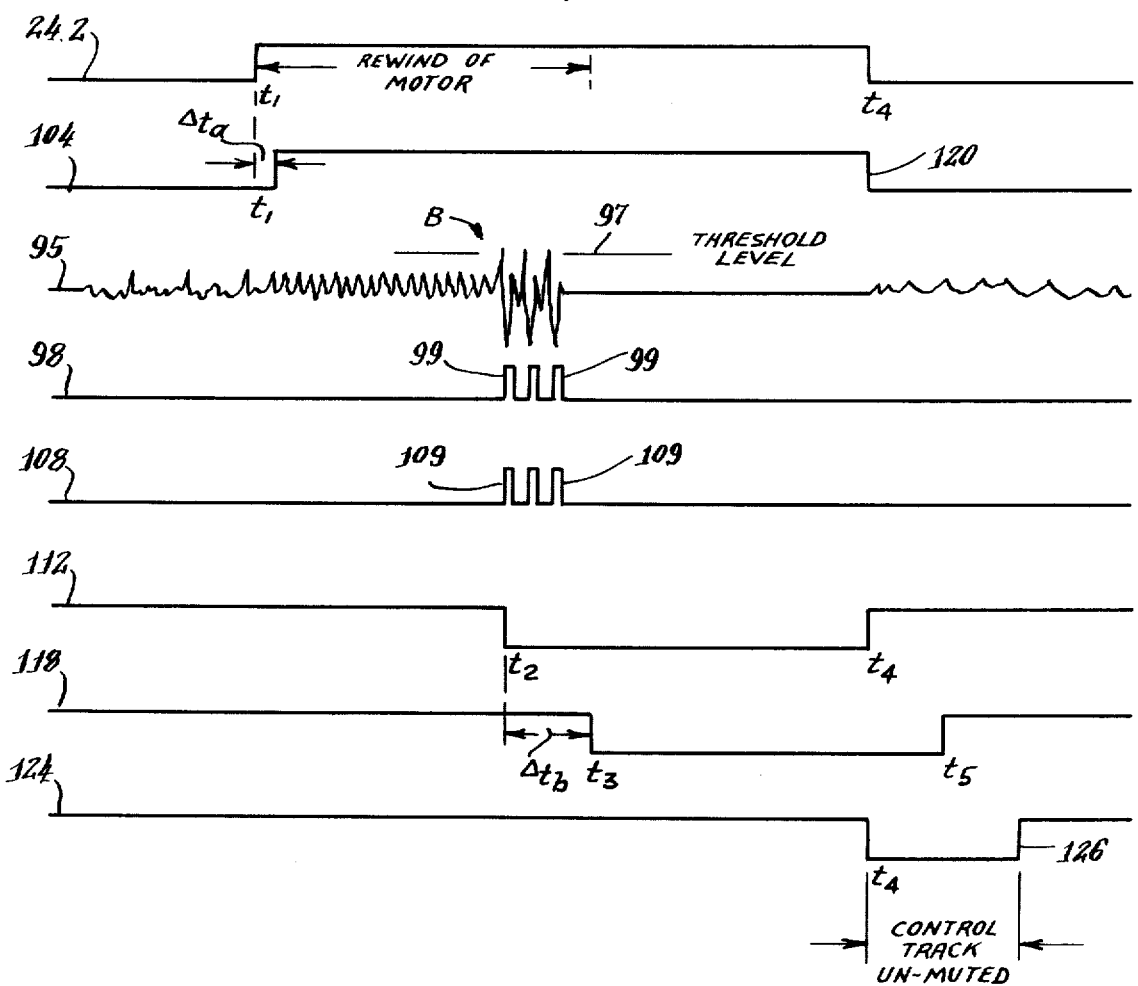
FIG. 4 is a timing diagram for waveforms developed in the performance learning system as shown in FIG. 1.

This provides an immediate return path for the power applied to rewind motor 80 through the normally enabled or closed switch 92 and the tape commences to reverse. Actuation of repeat switch establishes a playback switch opening potential on motor lead 84.2, thus interrupting the playback of track 18.1 while applying an enabling level signal to delay network 106. The duration of delay $\Delta t_a$, see FIG. 4 is of the order of about one tenth of a second. This delay is long enough to assure passage of the control signal corresponding to the stop notation C in the event the repeat switch 78 was actuated at a time when the C stop control signal was opposite the control playback head 16.3. The delay is sufficiently short to avoid masking of the B control signal during the repeat mode. When one appreciates that the stop notations 74 generally occur not more frequently than about once every ten seconds during playback, a delay of about 0.1 seconds is long enough, even with a tape reversal speed of twenty times the normal playback and record speeds.

As the tape reverses at the motor controlled accelerated speed, the stop or backtrack signal on control track 18.3 and corresponding to the stop notation B (74.2) moves past control playback head 16.3 and produces a high pulse signal therefrom by virtue of the high reverse tape speed. The B stop control signal arrives at comparator 96 with a sufficient magnitude to overcome the threshold level 97 from network 100 to produce a series of pulses 99 on line 98, see FIG. 4. The AND gate 102, having in the meantime been enabled by the delayed output 104 from delay 106, then produces output pulses 109 on line 108 to set flip-flop 110 which removes the active or positive condition from the flip-flop output 112 at time $t_2$.

The change in the output 112 is delayed by network 116 for a time period $\Delta t_b$ which is sufficiently long to allow the motor 80 to move the B stop signal on control track 18.3 past the control head 16.3. Preferably, delay 116 is of sufficient duration (about one-tenth of a second) to assure that the tape is stopped at a point such as 130 (see FIG. 3) corresponding to time $t_3$ when at least one bar of music is between stop notation B and playback head 16.3. When the output of delay network 116 goes to an inactive or ground level at the end of its delay, the semiconductor switch 92 is opened and the rewind motor 80 is stopped.

The logic condition of flip-flop 110 is maintained until the student again actuates repeat switch 78 by pushing it to its OFF position at time $t_4$. This action produces an activating waveform signal from lead 84.2 to delay network 106 causing the latter to reset flip-flop 110. Delay 106 is of the non-symmetrical type in that it provides the $\Delta t_a$ delay when line 84.2 goes positive but has a negligible delay when line 84.2 is returned to ground potential when the repeat switch is pushed to its OFF position. such delay may be accommodated with a network such as shown in FIG. 6 wherein a diode 105 effectively bypasses resistor 107 when input line 84.2 is returned to ground. Hence, essentially at time $t_4$ the output 112 of flip-flop 110 returns to an active or positive level and the control input 118 of semiconductor switch 92 is provided with an enabling or closing signal at the end of the delay from network 116 at time $t_5$. Current, however, cannot flow through the enabled switch 92, since pole 88.1 of the repeat switch 78 has been moved to its circuit interrupting position as shown in FIG. 1.

At the same time that flip-flop 110 was reset and output 112 went positive or active, the pulse network 114 was activated to provide a playback closing pulse 126 on line 124. Hence, for a short time period as determined by the duration of pulse 126, and following the inactivation of the repeat switch 78 at time $t_4$, control signals from the control track 18.3 appear at the output of amplifier 30 for acoustic presentation.

The stop control signals are, therefore, preferably formed of intelligible characters corresponding to the stop notations 74 on music sheet 70 shown in FIG. 2. Thus, when the student resumes playback from position 130 (see FIG. 3), of ensemble track 18.1 to re-record his own performance, he at first hears a bar of music followed by an audible presentation of the B stop pulse and notation. At the end of the enabling pulse 126, the playback switch 24.3 is again opened to inhibit further playback of stop pulses from control track 18.3.

The repeat mode thus enables the student to backtrack to a previous learning segment. This is automatically accomplished by the actuation of the repeat switch 78. When it is desired to backtrack further, several actuations of the repeat switch 78 can be employed. Repeat switch 78 may be a manual switch on the tape deck control, or a foot pedal operated switch coupled with a suitable electro-mechanical actuator to bring rewind motor 80 into mechanically operative contact with tape cassette 12.

In certain cases the sheet music may, as shown in FIG. 3, include a repeat bar 132. In such case the sheet music is provided with double stop notations in the sequence by which the musical score 72 must be played. Thus, in the first pass, the stop notations F, G and H are effective for backtracking if necessary. During the repeat pass, the stop notations, I, J and K are in effect.

Volume controls 26 are formed of potentiometers coupled through capacitors 134 to input junction 28 of output amplifier 30. A fast forward control 136 may be employed through the repeat switch 78 OFF position. The fast forward control 136 includes appropriate switches to supply a positive potential to lead 84.1 during the fast forward mode.

The above operational description may be conveniently adapted by a student learning a role in a play. In such case the ensemble rendition on track 18.1 carries a recording of the performance of all the actor roles except the role intended to be learned by the student. A visual presentation 70 in the form of the normal play script is provided with stop notations such as 74 located as cue stops prior to the sentences to be spoken by the student for the omitted role. In this manner a student can backtrack to previous role cues in the play.

With reference to FIG. 5, a system 140 is shown to prerecord a tape cassette 12 with the ensemble and exemplary renditions as well as the stop signals on the control track 18.3. System 140 includes playback/record heads 16 for each of the tracks 18 and individually actuatable erase heads 20 for the respective tracks. A mechanical tape drive and control, such as shown at 21 in FIG. 2, is provided to move tape 12 past the record heads 16.

The record and playback heads 16 are coupled through record/playback switches 44 to either a playback network 142 or to a record amplifier output 144 and erase network 146. A microphone 50 is shown coupled through amplifier 48 to pole 148 of a track record selector switch 150. Switch 150 has five positions and is preferably ganged to the record/playback switches 44. Hence, when it is desired to record on control track 18.3, the microphone signal is coupled through switch 150 to drive the erase network 146.2 and through switch 44.2 to control track head 16.3. Individual tracks can thus be recorded and provided with the required ensemble and exemplary renditions and the control track stop signals. Note that the control stop signals can be played back at normal tape playback speed to present the audible form of the stop notations 74 on music sheet 70. However, during the repeat mode, these control signals appear as a higher amplitude pulse by virtue of the rapid tape reversal caused by rewind motor 80. Care is to be taken that the respective tracks are recorded with the proper synchronization to enable the combined track playback of the ensemble and exemplary tracks.

A convenient feature for music learning tapes produced by the recording network 140 shown in FIG. 5 is the recording of metronome signals on the control track 18.3 with a high frequency burst producing network 152. Network 152 is formed with a normally open push-button switch 154 and a switch jitter remover circuit 156. The latter circuit delivers a clean single pulse on output line 158 for each manual actuation of switch 154.

The pulse on line 158 in turn produces a pulse of about a half millisecond long from pulse generator 160 connected to a high audio frequency burst generator 162. The latter produces an output burst of about 7.5 KHz for recording on control track 18.3. The tone bursts may be conveniently actuated to coincide with rhythms of the sheet music as shown in FIG. 3.

The recording of metronome signals and control signals of the same track is done with frequency separation to enable convenient playback. Thus the control signals are recorded after passage through a low pass filter 164 whose cut-off frequency is below that of the frequency of the tone bursts from oscillator 162, i.e. about 4 KHz. Hence, during playback low pass filter 75 and high pass filter 79 can properly separate the control and metronome signals.

Having thus described a performance learning system in accordance with the invention, its many advantages can be appreciated. A student may conveniently select the desired operation by first listening to a preferred professional performance, then the combination of the professional with the ensemble and then to his own performance alone or with the ensemble. Corrections can be conveniently made whenever errors are made.

What is claimed is:

1. A performance learning system for a program comprising a readable record carrying notations pertaining to a predetermined uninterrupted performance for the program, the readable record carrying visual stop notations spaced along the program at locations selected to designate learning segments for a student;

a multiple track magnetic medium, said magnetic medium being provided with an ensemble prerecorded track on which is recorded, in a playback/record directional movement of the magnetic medium, a continuous uninterrupted recording of the program with said predetermined performance omitted from the recorded ensemble, a student track to record, in the playback/record direction, a student's rendering of the omitted performance, said magnetic medium being provided with prerecorded control signals located on the magnetic medium in corresponding spaced relationship with the ensemble recording as the visual stop notations are located on the readable record relative to the performance thereon;

means for playing back recordings from the magnetic medium tracks and producing playback signals and control signals representative of the recordings on the magnetic medium;

means operative during playback/record movement of the magnetic medium for recording a student's rendition of the omitted performance on the student track in synchronous relationship with the playback of the uninterrupted ensemble recording;

repeat means for causing rapid backtrack motion of the magnetic medium;

switch means for interrupting backtrack movement of the magnetic medium; and backtrack control means coupled to the stop control signals for enabling actuation of the switch means during backtrack movement of the magnetic medium to terminate its motion at a desired stop control signal;

whereby a student may backtrack to a previous stop control signal at a visually identifiable location on the readable record for a repeat of a student rendition of the omitted performance.

2. The performance learning system as claimed in claim 1 wherein the backtrack control means further includes means for detecting control signals being generated by the playing back means from the control track during the rapid backtrack movement of the magnetic medium; and means responsive to a detected control signal for terminating rapid backtrack movement and stopping the magnetic medium at a location corresponding to the desired stop notation on the readable record.

3. The performance learning system as claimed in claim 2 wherein the backtrack control means further includes delay means responsive to a detected control signal during back-tracking of the magnetic medium for terminating the backtrack movement of the medium a predetermined time period after detection of the control signal.

4. The performance learning system as claimed in claim 3 wherein the control signal detecting means further includes means producing a threshold signal representative of a preselected amplitude threshold level of control signals generated during the rapid backtrack movement of the magnetic medium; and means responsive to the threshold signal and the control signals generated during backtracking of the magnetic medium for producing a stop signal when the played back control signals exceed the threshold signal.

5. The performance learning system as claimed in claim 1 wherein the multiple track magnetic medium further includes a fourth track carrying an exemplary rendition of the omitted performance.

6. A music learning system for an uninterrupted musical score comprising a readable music record carrying musical notations pertaining to a predetermined instrument for the uninterrupted musical score, the readable musical record carrying visual stop notations spaced along the musical score at locations to designate learning segments for a student;

a multiple track magnetic medium, said magnetic medium being provided with a first ensemble track on which is recorded, in a playback/record directional movement of the magnetic medium, a continuous ensemble recording of the uninterrupted musical score with a predetermined musical instrument omitted from the recorded ensemble; a second student track to record, in the playback/record direction, a student's rendering of the musical score on the omitted instrument; and a third track on which stop control signals are recorded at locations which correspond in spaced relationship with the ensemble recording as the visual stop notations on the readable music record, said stop control signals being audibly identifiable upon playback of the magnetic medium;

means for moving the magnetic medium in a playback/record direction;

playback means for selectively playing back recordings from the magnetic medium tracks and producing playback signals and stop control signals representative thereof;

means for recording on the student track during the playing back of a recording from another magnetic medium track to enable a student's performance of the omitted instrument to be recorded on the student track in synchronous relationship with the playback of the ensemble recording;

means for causing rapid backtrack motion of the magnetic medium;

switch means for interrupting backtrack movement of the magnetic medium;

backtrack control means coupled to the audibly identifiable stop control signals for enabling actuation of the switch means during rapid backtrack movement of the magnetic medium to terminate its motion at a desired stop control signal;

means for enabling audible reproduction of the stop control signals during a predetermined time period following termination of the backtrack motion of the magnetic medium;

whereby a student may rapidly backtrack to a previous stop control signal at a visually identifiable location on the musical record for a repeat of a rendition of the omitted instrument.

7. A music learning system for an uninterrupted musical score comprising a readable music record carrying musical notations pertaining to a predetermined instrument for the uninterrupted musical score, the readable music record carrying visual stop notations spaced along the musical score at locations to designate learning segments for a student;

a multiple track magnetic medium, said magnetic medium having a first track which carries, in a playback/record directional movement of the magnetic medium, a continuous exemplary recording of the readable music record by the predetermined instrument, a second control track which carries stop control signals located in corresponding spaced relationship with the exemplary recording on the first track as the visual stop notations on the readable music record and being audibly identifiable upon normal playback of the control track, and a third student track for recording, in the playback/record direction, a student's musical performance of the readable music record;

means for playing back selected recordings of the tracks;

means for recording a student's performance on the student track in synchronization with the playback of the continuous exemplary recording on the first track;

means for backtracking the magnetic medium to a desired stop control signal;

means operative during playback by said playing back means and during recording by said recording means for normally inhibiting the stop control signals on the control track from being audibly played back; and means for overriding said inhibiting means for a predetermined duration upon backtrack of the magnetic medium to a desired stop control signal to enable audible playback of a stop control signal for identification by the student of the audibly played back stop control signal during a repeat rendition of the student's musical performance.

8. The music learning system for a musical score as claimed in claim 7 wherein the means for backtracking the magnetic medium to a desired control signal further includes means for reversing the magnetic medium movement relative to the playback and record direction while maintaining the magnetic medium inoperative relationship with the playback means;

means for detecting a stop control signal signal during the reversal motion of the magnetic medium and producing a stop signal indicative thereof; and means responsive to the stop signal for terminating the reversal movement of the magnetic medium at a location corresponding to a stop notation on the readable music record.

9. A music learning system for a musical score comprising

A. a readable music record carrying musical notations pertaining to a predetermined instrument for the musical score, the readable music record carrying visual stop notations spaced along the musical score at locations to designate learning segments for a student;

B. a multiple track magnetic medium, said magnetic medium carrying an exemplary recording of the readable music record by the predetermined instrument on a first track, a second control track of the magnetic medium being provided with stop control signals located in corresponding spaced relationship with the exemplary recording on the first track as the visual stop notations on the readable music record and being audibly identifiable upon normal playback of the control track, and a third student track for recording a student's musical performance of the readable music record;

C. means for playing back selected recordings of the tracks;

D. means for recording on the student track to enable a student's performance to be recorded thereon; and E. means for rapidly moving to a desired control signal on the control track to resume operation of the system from a corresponding stop notation on the readable music record, said rapidly moving means including 1. means for reversing the magnetic medium movement relative to the playback and record direction while maintaining the magnetic medium in operative relationship with the playback means;
2. means for detecting a stop control signal during the reversal motion of the magnetic medium and producing a stop signal indicative thereof;
3. means responsive to the stop signal for terminating the reversal movement of the magnetic medium at a location corresponding to a stop notation on the readable music record and
4. delay means effectively interposed between the stop signal and the means for terminating the magnetic medium reversal movement for stopping the magnetic medium at a pre-selected distance from the magnetic medium stop producing control signal.

10. A performance learning apparatus using a multiple track magnetic tape comprising means for moving the tape along a playback record direction and a rewind backtrack direction;

means for playing back signals recorded on the tape tracks and producing track signals individually representative of the tape tracks;

means for recording on one of the tape tracks during playback of a prerecorded performance on another tape track to record a student performance in synchronism with a prerecording on the tape track being played back;

means for audibly reproducing played back track signals;

means for selecting audible reproduction between the tape tracks;

means responsive to track signals from one of the tape tracks for producing stop control signals representative of predetermined learning segments of the prerecorded performance recorded on a tape track;

means responsive to stop control signals played back during tape backtracking for terminating the tape backtracking movement at a desired learning segment; and means enabled for a predetermined time period following the backtrack movement of the magnetic tape to the desired learning segment for audibly reproducing a prerecorded identification of the desired learning segment upon resumption of playback.

11. A performance learning apparatus using a multiple track magnetic tape comprising means for advancing the tape along a playback and record direction;

means for playing back signals recorded on the tape tracks and producing signals individually representative of the tape tracks;

means for audibly reproducing the played back signals;

means interposed between the playback means and the audible reproducing means for selecting a tape track to be audibly reproduced;

means responsive to signals from one of the tape tracks for producing stop control signals representative of predetermined learning segments of a performance recorded on a tape track;

means for backtracking the tape to a desired learning segment; and means responsive to control signals played back during tape backtracking for terminating the tape backtracking at the desired learning segment, said backtracking terminating means including first delay means for inhibiting the termination of the tape backtracking for a time period sufficiently long to prevent termination of tape backtracking essentially when initiated.

12. The performance learning apparatus as claimed in claim 11 wherein the backtracking terminating means further includes second delay means effectively responsive to a control signal played back during tape backtracking for delaying termination thereof for a time period sufficient to assure playing back of the entire desired learning segment.

13. A performance learning apparatus using a multiple track magnetic tape comprising means for advancing the tape along a playback and record direction;

means for playing back signals recorded on the tape tracks and producing signals individually representative of the tape tracks;

means for audibly reproducing the played back signals;

means interposed between the playback means and the audible reproducing means for selecting a tape track to be audibly reproduced;

means responsive to signals from one of the tape tracks for producing stop control signals representative of predetermined learning segments of a performance recorded on a tape track;

means for backtracking the tape to a desired learning segment;

means responsive to control signals played back during tape backtracking for terminating the tape backtracking at the desired learning segment; and means for enabling the audible playback of a control signal to orally identify the learning segment.

14. A performance learning apparatus using a multiple track magnetic tape comprising A. means for advancing the tape along a playback and record direction;

B. means for playing back signals recorded on the tape tracks and producing signals individually representative of the tape tracks;

C. means for audibly reproducing the played back signals;

D. means interposed between the playback means and the audible reproducing means for selecting a tape track to be audibly reproduced;

E. means responsive to signals from one of the tape tracks for producing stop control signals representative of predetermined learning segments of a performance recorded on a tape track; said stop signal producing means including 1. means for generating a backtrack threshold signal representative of a preselected magnitude of control signals generated during backtracking of the tape; and 2. means responsive to the backtrack threshold signal and the played back control signals for producing the stop control signals when the played back control signals exceed the backtrack threshold signal, F. means for backtracking the tape to a desired learning segment; and G. means responsive to control signals played back during tape backtracking for terminating the tape backtracking at the desired learning segment.

15. The performance learning apparatus as claimed in claim 14 and further including filter means responsive to the played back control signals for delivering low frequency signals to the stop signal producing means and producing separated high frequency signals; and means for displaying the high frequency signals from the filter means to generate metronome representations of music recorded on one of the tape tracks.

16. A music learning system comprising means for producing a multiple track tape carrying a continuous ensemble recording of a musical score on a first track with a predetermined musical instrument omitted from the recorded ensemble and carrying prerecorded stop control signals representative of preselected learning segments of said musical score on a second control track at corresponding predetermined positions relative to the first track;

means for recording on a third student track simultaneously with the playback of the continuous ensemble recording to enable a student's performance of the omitted instrument to be recorded thereon in synchronism with the ensemble recording;

means for playing back selected recordings from the tape tracks and enable audible reproduction of predetermined combinations of tracks;

means for rapidly backtracking said tape;

means operative during backtracking of said tape for enabling the stop control signals recorded on the second track to terminate backtracking of said tape at a desired learning segment of the continuous ensemble recording; and means operative after a backtracking motion of said tape for enabling audible reproduction of a preselected stop control signal to facilitate student identification of the desired learning segment and subsequent synchronous recording on the third student track with the ensemble recording from said desired learning segment.

17. The music learning system as claimed in claim 16 wherein said second control track is further provided with metronome signals to enable the metronome signals during audible reproduction of the control track to provide an audible indication of the beat of the musical score for synchronous recording on the third student track of the desired learning segment.

18. The music learning system as claimed in claim 17 and wherein the multiple track tape is further provided with a recording of an exemplary rendition of the missing instrument on a fourth track of the tape.

* * * * *

UNITED STATES PATENT OFFICE
CERTIFICATE OF CORRECTION

PATENT NO. : 3,955,466
DATED : May 11, 1976
INVENTOR(S) : Peter C. Goldmark

It is certified that error appears in the above-identified patent and that said Letters Patent are hereby corrected as shown below:

Column 13, line 42, "inoperative" should be --in operative--.

In the Drawings, FIGURE 1, add the numeral 10 generally pointing to the entire circuit; the lead line for the switch labeled 24.3; and an electrical interconnection between the output of the amplifier 30 and the unconnected terminal of switch 38 coupled to the speakers 32.

Signed and Sealed this

Twenty-third Day of November 1976

[SEAL]

Attest:

RUTH C. MASON
Attesting Officer

C. MARSHALL DANN
Commissioner of Patents and Trademarks